(12) United States Patent
Alm et al.

(10) Patent No.: US 9,007,474 B2
(45) Date of Patent: *Apr. 14, 2015

(54) PAN-TILT CAMERA

(71) Applicant: AXIS AB, Lund (SE)

(72) Inventors: Carl-Axel Alm, Lund (SE); Stefan Lundberg, Lund (SE); Willy Sagefalk, Veberod (SE)

(73) Assignee: AXIS AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/179,809

(22) Filed: Feb. 13, 2014

(65) Prior Publication Data

US 2014/0160308 A1  Jun. 12, 2014

Related U.S. Application Data

(63) Continuation of application No. 13/502,299, filed as application No. PCT/EP2010/064826 on Oct. 5, 2010, now Pat. No. 8,848,064.

(30) Foreign Application Priority Data

Oct. 16, 2009 (EP) .................................... 09173280

(51) Int. Cl.
*H04N 5/228* (2006.01)
*H04N 5/232* (2006.01)
(Continued)

(52) U.S. Cl.
CPC .......... *H04N 5/23203* (2013.01); *G02B 6/3604* (2013.01); *H04N 5/2251* (2013.01)

(58) Field of Classification Search
CPC .................................... H04N 5/2259

USPC ...................................................... 348/211.14
See application file for complete search history.

(56) References Cited

U.S. PATENT DOCUMENTS

| 4,027,945 A | 6/1977 | Iverson |
| 4,109,997 A | 8/1978 | Iverson |

(Continued)

FOREIGN PATENT DOCUMENTS

| CN | 100477724 C | 4/2009 |
| EP | 0111390 A | 6/1984 |

(Continued)

OTHER PUBLICATIONS

Issa, O. et al., "3G Video Uploading Applications: Performance and Improvements" IEEE Multimedia, IEEE Service Center, New York, NY, US, vol. 1. 15, No. 4 Oct. 1, 2008, pp. 58-67, XP011241254, ISSN: 1070-986X.

*Primary Examiner* — Ahmed A Berhan
(74) *Attorney, Agent, or Firm* — Volpe and Koenig, P.C.

(57) ABSTRACT

A pan-tilt camera is arranged to include a camera head, a stationary unit, an intermediate member arranged between the camera head and the stationary unit, a first rotary joint rotatably connecting the camera head to the intermediate member, and a second rotary joint, rotatably connecting the intermediate member to the stationary unit. A communication path is provided between the camera head and the stationary unit, including an optical waveguide arranged between the camera head and the stationary unit. The optical waveguide has a first end positioned at the first rotary joint to receive light from the camera head through the first rotary joint. The other end of the waveguide is positioned at the second rotary joint and is arranged to send light to the stationary unit through the second rotary joint.

19 Claims, 8 Drawing Sheets

(51) Int. Cl.
*H04N 5/225* (2006.01)
*G02B 6/36* (2006.01)

(56) References Cited

U.S. PATENT DOCUMENTS

| | | | |
|---|---|---|---|
| 4,109,998 A | 8/1978 | Iverson | |
| 4,373,779 A | 2/1983 | Dorsey | |
| 4,398,791 A | 8/1983 | Dorsey | |
| 4,436,367 A | 3/1984 | Lewis et al. | |
| 4,447,114 A | 5/1984 | Koene | |
| 4,492,427 A | 1/1985 | Lewis et al. | |
| 4,943,137 A | 7/1990 | Speer | |
| 5,436,655 A | 7/1995 | Hiyama et al. | |
| 5,745,223 A * | 4/1998 | Ikeda | 356/4.01 |
| 6,031,949 A | 2/2000 | Davies | |
| 6,479,813 B2 | 11/2002 | Takada et al. | |
| 6,707,189 B2 | 3/2004 | Ito et al. | |
| 6,830,337 B2 | 12/2004 | Angerpointner | |
| 6,898,346 B2 | 5/2005 | Mercey et al. | |
| 7,046,295 B2 * | 5/2006 | Hovanky | 348/373 |
| 7,236,200 B2 | 6/2007 | Vernon | |
| 7,246,949 B2 | 7/2007 | Thiele et al. | |
| 7,573,502 B2 * | 8/2009 | Sassa | 348/211.2 |
| 7,583,289 B2 | 9/2009 | Hovanky et al. | |
| 8,125,534 B2 | 2/2012 | Shimonaka | |
| 2001/0006218 A1 | 7/2001 | Takeada et al. | |
| 2003/0090353 A1 | 5/2003 | Robinson et al. | |
| 2006/0044406 A1 | 3/2006 | Swarr et al. | |
| 2007/0035657 A1 | 2/2007 | Oosawa | |
| 2008/0055436 A1 * | 3/2008 | Sarwari et al. | 348/272 |
| 2008/0175535 A1 | 7/2008 | Popp et al. | |
| 2008/0175536 A1 | 7/2008 | Krumme | |
| 2008/0218601 A1 * | 9/2008 | Suemoto | 348/231.99 |
| 2008/0267562 A1 | 10/2008 | Wang et al. | |

FOREIGN PATENT DOCUMENTS

| | | | |
|---|---|---|---|
| JP | 8307740 A | | 11/1996 |
| JP | H09284612 | | 10/1997 |
| JP | 2002262250 A | | 9/2002 |
| JP | 2007120742 | | 5/2007 |
| JP | 2008028756 A | | 2/2008 |
| JP | 2008098807 | | 4/2008 |
| JP | 2008227731 | | 9/2008 |
| JP | 2008304543 | | 12/2008 |
| JP | 2008304543 A | * | 12/2008 |
| JP | 2009009796 | | 1/2009 |
| JP | 2009081694 A | | 4/2009 |
| JP | 2009105710 A | | 5/2009 |
| JP | 2009177537 A | | 8/2009 |
| JP | 2009195601 A | | 9/2009 |
| WO | 2009105254 A2 | | 8/2009 |

* cited by examiner

PAN-TILT CAMERA

CROSS REFERENCE TO RELATED APPLICATIONS

This application is a continuation of U.S. patent application Ser. No. 13/502,299, filed Jun. 19, 2012, which is a 371 of International Application No. PCT/EP2010/064826 filed Oct. 5, 2010, which claims priority to European Application No. 09173280.0 filed Oct. 16, 2009, the entire contents which are incorporated by reference as if fully set forth herein.

FIELD OF INVENTION

The present invention relates to a pan-tilt camera and to the quality of the captured image.

BACKGROUND OF THE INVENTION

Digital pan-tilt cameras, hereinafter referred to as PT cameras, are often used in monitoring and surveillance applications and are therefore often required to capture images with high quality. The quality of the captured images from cameras becomes even more important when the cameras becomes more intelligent and therefore relies even more on that the quality of the images captured for processing in the camera is high.

There are quite many factors that have effect on the quality of an image captured by a digital camera. For example is the lighting of the scene to capture one such factor, less light results in less quality. Other factors are the quality of the lenses and the resolution of the image sensor. Yet another factor is noise from the image sensor of the digital camera. Even when using a High Definition (HD) image sensor having high resolution the acquired image may gain much quality from noise reduction.

In a modern CMOS based image sensor the light from the scene to capture is collected and transformed into an analog electrical signal. This analog electrical signal is converted into a digital signal by an on chip analog to digital converter. The alternative technology used to capture images is CCD image sensors. These CCD image sensors usually require a couple of external components in order to reach the same functionality as the CMOS image sensor. These components should be arranged physically close to the sensor in order not to degrade the image signal with noise. Moreover, an increased temperature of a CMOS sensor or a CCD sensor makes the images from the image sensor noisier. In order to reduce the noise of the captured images various noise reduction techniques are applied both to the analog signal and to the digital signal. In some critical installations the image sensor may even be cooled using a cooling system external to the image sensor.

SUMMARY OF THE INVENTION

It is an object of the present invention to provide an enhanced PT camera.

This object is achieved by means of a PT camera according to claim 1. Further embodiments of the invention are disclosed in the dependent claims.

In particular, according to a first aspect of the invention, a PT camera comprises a camera head, a stationary unit, an intermediate member arranged between the camera head and the stationary unit, a first rotary joint rotatably connecting the camera head to the intermediate member, a second rotary joint rotatably connecting the intermediate member to the stationary unit, a communication path between the camera head and the stationary unit, the communication path including an optical waveguide arranged between the camera head and the stationary unit, the optical waveguide having a first end and a second end, the first end being positioned at the first rotary joint and being arranged to receive light from the camera head through said first rotary joint, and the second end being positioned at the second rotary joint and being arranged to send light to the stationary unit through said second rotary joint. The PT camera is characterized by an image processing unit being arranged in the stationary unit, and by said image processing unit including a color interpolator arranged to perform a first color interpolation of the image data from the image sensor.

By arranging the image processing unit performing the first color interpolation of the image data from the image sensor in the stationary unit, at least one computing intense processing is removed from the camera head close to the image sensor. This type of computing intense processing requires a lot of current and thereby introduces a lot of heat and thereby increases the temperature of the surroundings of the image processing unit. Hence, the arrangement of said image processing unit in the stationary unit increases the captured image quality, because a high temperature heat source is removed from the vicinity of the image sensor.

Further, the introduction of the optical link and thereby making it feasible to arrange the processing unit for processing substantially unprocessed image data in the stationary unit also contribute to the increased image quality being achieved due to less heat generated in proximity to the image sensor. The optical link enables high speed communication and transmission of large amounts of data. Thereby it is possible to arrange the processing unit for processing the substantially unprocessed image data in the stationary unit at a distance from the image sensor.

Further, by arranging the image processing unit in the stationary unit fewer components is required in the camera head making the camera head weigh less and thereby making it easier to turn the camera head with precision. Additionally, the lesser weight makes it possible to use a smaller motor to operate the turning of the camera head. Moreover, less number of components requiring a lot of current and a smaller size motor makes it possible to provide power to the camera head using simpler means than in a camera head not implementing the invention, because the camera head will require less power.

In the context of the present invention the term up-link and downlink, respectively, are to be understood as specifying the direction of communication. The up-link direction specifies, in the present application, a direction from the camera head to the stationary unit and the down-link direction specifies, in the present application, a direction from the stationary unit to the camera head.

According to one embodiment the first rotary joint is arranged to turn around a first axis and the second rotary joint is arranged to turn around a second axis, and wherein the first axis and second axis are substantially perpendicular to each other.

According to yet another embodiment the optical waveguide is an optical fiber. In another embodiment the optical waveguide is molded.

In one embodiment the image processing unit is arranged to process raw image data in the stationary unit.

According to another embodiment the communication path further includes an up-link optical transmitter arranged to send light over the first rotary joint into the optical waveguide, and an up-link optical receiver arranged to receive light over the second rotary joint from the optical waveguide.

In another embodiment the communication path further includes a camera head optical waveguide arranged in the camera head and arranged to send light over the first rotary joint to the first end of the optical waveguide, and a stationary unit optical waveguide arranged in the stationary unit and arranged to receive light over the second rotary joint from the second end of the optical waveguide.

According to one embodiment said first end of the optical waveguide further is arranged to send light to the camera head through the first rotary joint, and said second end of the optical waveguide further is arranged to receive light from the stationary unit through said second rotary joint. This allows the PT camera to communicate over the optical communication path in both directions.

According to another embodiment the communication path further includes a down-link optical receiver arranged to receive light over the first rotary joint from the optical waveguide, and a down-link optical transmitter arranged to transmit light over the second rotary joint into the optical waveguide.

In one embodiment of the PT camera the image processing unit in the stationary unit further includes a noise reducer, in another embodiment it includes a color space converter, and in a further embodiment it includes an image compressor for compressing the image data. All of these features are functions requiring a lot of power and current. Therefore the arrangement of them in the stationary unit contributes to the increase of image quality due to exposing the image sensor to less heat.

In another embodiment the color interpolator is a Bayer pattern interpolator.

According to another embodiment the PT camera further includes an electrical motor arranged in the camera head and connected to the first rotary joint for turning of the camera head around the rotary axis of said first rotary joint. One advantage of arranging the motor in the camera head is that the production of the camera may be facilitated due to the fact that no electronics then has to be manufactured into the intermediate part and that the motor is mounted in the camera head where there have to be electronics installed any way. Moreover, the control signals to the motor may then be sent via the communication path to the camera head without having to return the signals via the joint between the camera head and the intermediate portion. Thereby the reliability of the device is increased as one point prone to failure is removed.

According to yet another embodiment the communication path further includes a lens arranged between the first end of the optical waveguide and the up-link optical transmitter.

In yet another embodiment the communication path further includes a lens arranged between the second end of the optical waveguide and the up-link optical receiver. It is beneficial to use a lens to be able to guide the light from the up-link optical transmitter or down-link optical receiver into the optical waveguide.

In yet another embodiment the PT camera further includes a down-link communication path including an electrical slip-ring arrangement between the intermediate member and the stationary unit.

In another embodiment the PT camera further includes a down-link communication path including a wireless transmitter arranged in the stationary unit for wireless transmission of data to the camera head, a wireless receiver arranged in the camera head for wireless receipt of the data from the stationary unit.

BRIEF DESCRIPTION OF THE DRAWINGS

This and other aspects of the present invention will now be described in more detail, with reference to appended drawings showing embodiments of the invention. The figures should not be considered limiting the invention to the specific embodiment; instead they are used for explaining and understanding the invention. Like numbers refer to like elements throughout the figures.

FIG. 6b is a schematic view of a two rotary joints, showing the optical coupling in each point for a camera unit according to FIG. 6a.

DETAILED DESCRIPTION OF THE PREFERRED EMBODIMENTS

Figure 1A:
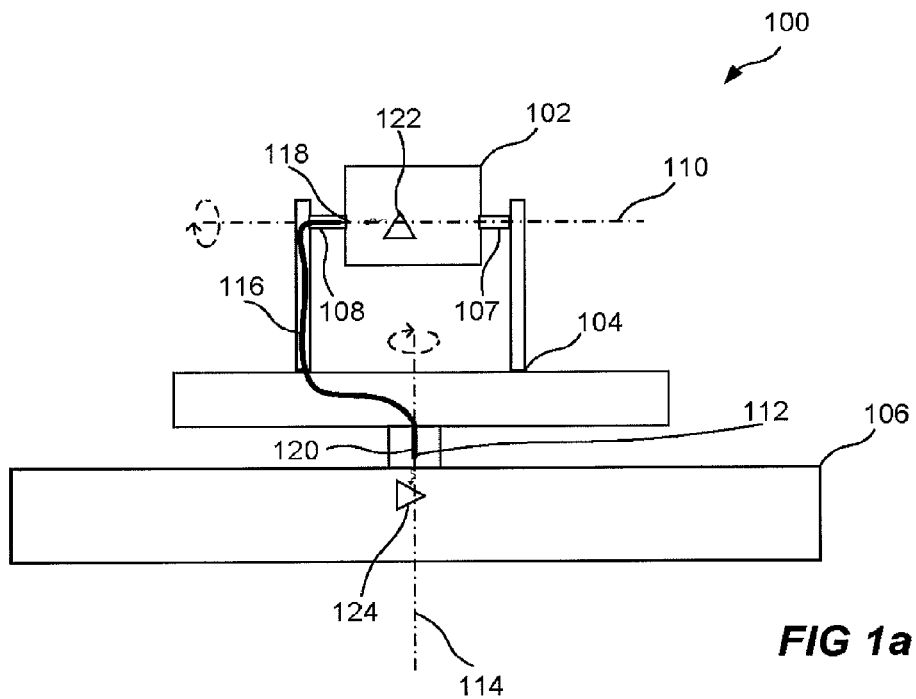
FIG. 1a is a schematic side view of a camera unit according to one embodiment.
Figure 1B:
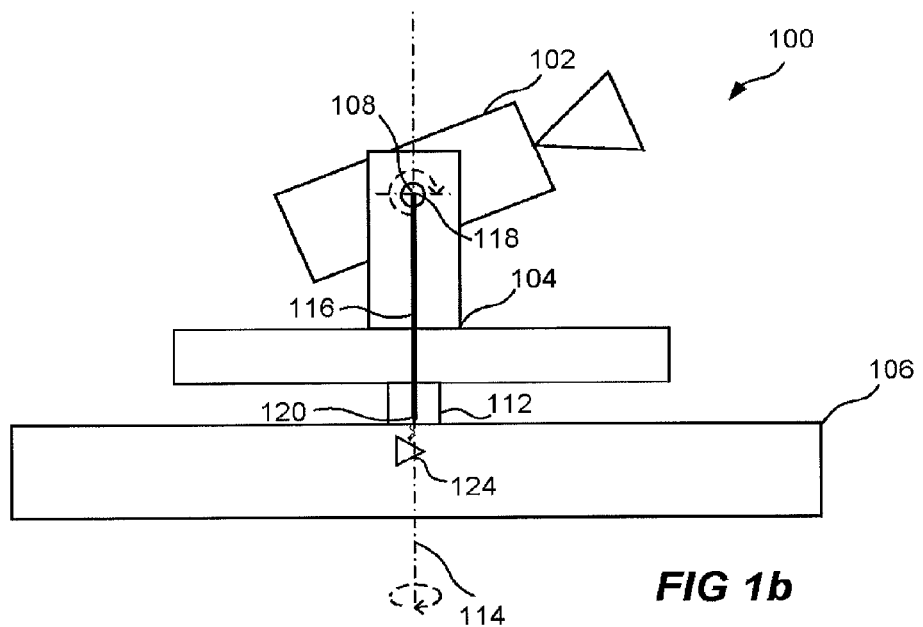
FIG. 1b is a schematic side view of the camera of FIG. 1a at a different angle.

FIGS. 1a-b show schematic views of a camera unit 100 according to one embodiment of the invention. The camera unit 100 comprises a camera head 102, an intermediate member 104, and a stationary unit 106. The camera head 102 is attached to the intermediate member 104 by means of two joints 107, 108 enabling turning of the camera head 102 around a first axis 110, hereinafter referred to as a tilting axis 110. According to another embodiment the camera head 102 is attached to one joint 107 or 108 and is also turnable around the tilting axis 110. The intermediate member 104 is connected to the stationary unit 106 via yet another joint 112. The joint 112 between the intermediate member 104 and the stationary unit 106 is arranged to enable rotation around a second axis 114 of the intermediate member 104 in relation to the stationary unit 106 by multiple turns, thus enabling turning multiple 360 degree turns of the intermediate member 104 in relation to the stationary unit around the second axis 114, hereinafter referred to as panning axis 114.

An optical waveguide 116 is mounted to the intermediate member 104. The optical wave guide 116 having a first end 118 facing towards the camera head 102 at the joint 108 at the tilting axis 110 and a second end 120 facing towards the stationary unit 106 at the joint at the panning axis 114. The optical waveguide 116 may be an optical fiber of the type single mode fiber, gradient index fiber, plastic optical fiber or a similar waveguide. Alternatively, the optical waveguide 116 is molded as a separate part or it is molded onto or within the intermediate member 104.

By using an optical wave guide 116, problems relating to, for instance, many high-end PT cameras which have the ability to rotate n×360 degrees, especially in the rotational direction of panning, may be solved. Many, cameras designed for this purpose are prone to entangling cables for transmitting image signals, power, control signals etc., which are running from the camera head to stationary parts. Historically this problem has been solved generally by using a slip-ring joint for the transfer of electrical signals and power over the panning joint 112, and cables for the tilting joint 108, 107, limiting the rotation around the tilting axis 110, which due to other features of the camera assembly 100 normally is restricted to turning more than 180 degrees. The slip-ring joint, used for the panning rotation, enabled free rotation without restrictions of cables.

However, slip-ring joints supporting a plurality of channels and supporting high-frequency signals are in general expensive, heavy, and bulky and generate excessive heat in the camera. Hence, these slip-ring joints introduces technical problems in the camera construction, such as internal heat problems and the large size of the camera products resulting in, for example, the cameras being difficult to mount due to the weight and bulkiness of them.

To decrease the costs in low-end PT cameras the slip-ring in the panning joint 112 was often replaced by cables which were cleverly mounted through the mechanics. These cameras may not be rotated, i.e. panned or tilted, without mechanical restrictions, as the cables do not allow unlimited turning without breaking. Even if the number of degrees allowed for turning the camera was restricted, in order to avoid breaking, the cables were worn out due to repeated panning and tilting of the camera. In general, problems with wearing of the cables due to the rotation as well as the height needed for the cable-based joint increased with the number of cables in the joint. Accordingly, current PT cameras have either mechanical restrictions related to the panning rotation using cables or are expensive, heavy and bulky due to use of a slip-ring design for transfer of image signals, power, control signals etc between the stationary part and the pan- and tilt enabled camera head.

Yet another solution is to use optical communication by mounting a transmitter and receiver on either sides of the panning joint, see the published Japanese patent application 09-284612. These solutions have however not gained interest by the industry due to problems with the height and complexity of such product resulting from the fact that drive circuits and optical components have to be mounted in the intermediate part 104 of the camera assembly 100 arranged between the panning joint 112 and the tilting joint 107, 108.

These problems may be solved by arranging an optical wave guide 116 as previously described. Moreover there are several additional benefits in implementing a communication path in the PT camera 100 using optical wave guides 116 instead of for example wireless solutions. One of these benefits relates to cameras used in environments where security is important. In terms of security, the optical waveguide 116 does not emit any electromagnetic radiation which for example both wireless solutions such as WLAN and electrically wired systems do. In particular the wireless solution may be a security hazard as the communication may be accessed at quite a distance from the camera. Hence, the system operating with an optical waveguide 116 is safer against interfering signals and is able to prevent eavesdropping of the signal generated by the camera unit 100.

One benefit in relation to implementing the communication path by means of a slip ring or cables is that an optical wave guide between the camera head and the stationary unit and the sending light from the camera head into the optical waveguide through the rotary joint and the receiving light from the optical waveguide through the rotary joint at the stationary unit makes it possible to experience a decrease in the mechanical wear of operation critical components, e.g. the communication path, and at the same time make the camera smaller, lighter and less complex than previous PT cameras.

Another benefit is that an optical communication path 116 enables transmissions using a high bandwidth and thus larger quantities of data can be transferred over the optical communication path.

Figure 2A:
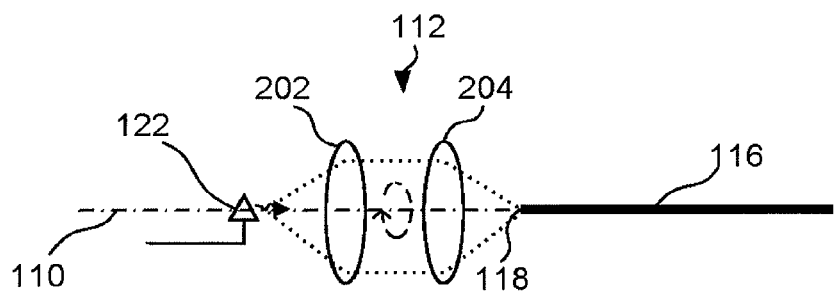
FIG. 2a is a schematic view of a first rotary joint, showing the optical coupling in that point.
Figure 2B:
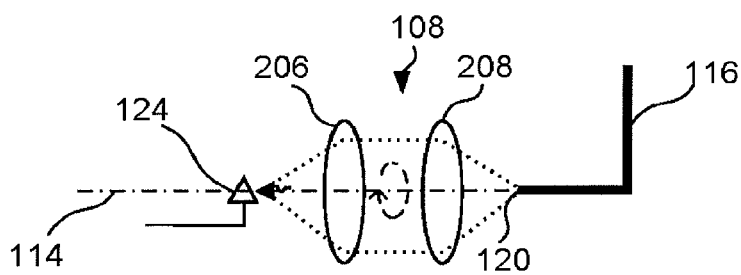
FIG. 2b is a schematic view of a second rotary joint, showing the optical coupling in that point.

Once more referring to FIGS. 1a-b, according to one embodiment of the invention image capturing and handling components are arranged inside the camera head 102, these components will be described in more detail later. Captured image data may be transferred either in a processed format or in a raw format, i.e. substantially unprocessed format, to an optical transmitter 122 inside the camera head 102. The optical transmitter 122 converts the electrical signal into an optical signal. The transmitter includes an optical component that may be a light emitting diode, laser or the like. The optical signal is then sent across the joint 108 at the tilting axis 110 into the first end 118 of the optical waveguide 116 and is guided to the second end 120 of the optical waveguide 116. The second end 120 is situated, as described above, at the joint 112 at the panning axis 114. At the second end 120 the optical signal exits the optical waveguide 116 and travels across the joint 112 at the panning axis 114. An optical receiver 124 in the stationary unit 106 receives the optical signal and converts the optical signal into an electrical signal for further processing or transmits the signal to another processing device. The optical signal may for instance be light that is guided in the optical waveguide 116 using for example total internal reflection. FIG. 2a shows a schematic view of the optical coupling across the joint 112 at the tilting axis 110 and FIG. 2b shows a schematic view of the optical coupling across the joint 108 at the panning axis 114. The light from the transmitter 122 is emitted, travels over the joint 108, and enters into the first end 118 of the optical waveguide 116. Then the light exits the second end 120 of the optical waveguide 116, travels over the joint 112, and is received by the receiver 124. According to one embodiment the first end 118 of the optical waveguide 116 and the transmitter 122 are arranged at a distance from each other, thereby introducing an air gap between the first end 118 and the transmitter 122. The second end 120 of the optical waveguide 116 and the receiver 124 are also arranged at a distance from each other, thereby introducing an air gap between the second end 120 and the receiver 124. Hence each air gap allow a rotation about either the panning axis 114 or tilting axis 110 without any mechanical wearing of the optical connection in the joint. The short distance in free air is enough to guide the light from the transmitter 122 into the optical waveguide 116 and from the optical waveguide 116 into the receiver 124. During rotation around the panning axis 114, the second end 120 of the optical waveguide 116 and the receiver 124 are rotated about the same axis and during rotation around the tilting axis 110 the first end 118 of the optical waveguide 116 and the transmitter 122 are rotated about the same axis. However, according to a further embodiment the optical coupling may be enhanced by a lens system as illustrated in FIG. 2a and FIG. 2b. In the figure, one lens 202, 208 is used to collimate the light and one lens 204, 206 is used to focus the light. The lens system is so arranged as it can guide the light in both directions. Depending on the transmission direction a single lens acts as a collimating lens or as a focusing lens. In yet another alternative embodiment it may be sufficient to have only one lens 202, 204, 206, 208, placed either on the transmitter or receiver part or on the optical waveguide 116.

Figure 3A:
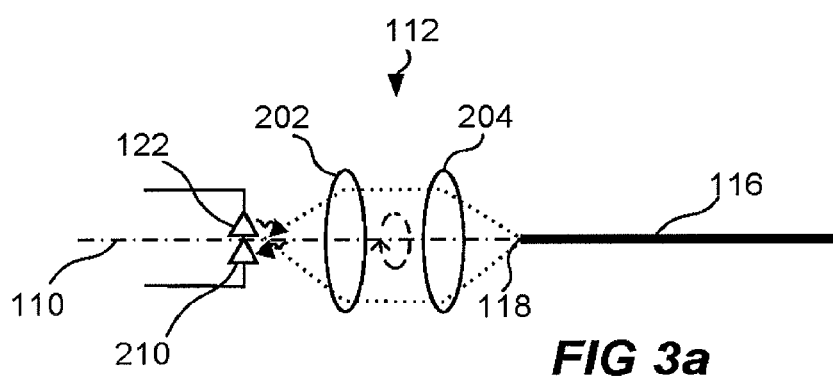
FIG. 3a is a schematic view of a first rotary joint, showing bidirectional optical coupling in that point.
Figure 3B:
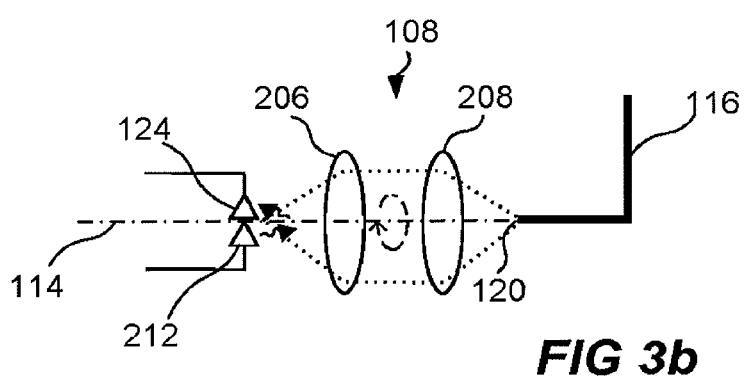
FIG. 3b is a schematic view of a second rotary joint, showing bidirectional optical coupling in that point.

In one preferred embodiment, see FIGS. 3a-3b the optical communication path is bi-directional, that means that the communication path is able to carry light in a direction from the camera head 102 to the stationary unit 106, up-link direction, and in a direction from the stationary unit 106 to the camera head 102, down-link direction, simultaneously. To achieve this, a down-link receiver 210 is arranged together with the up-link transmitter 122 in the camera head 102 and a down-link optical transmitter 212 is arranged together with the up-link optical receiver 124 in the stationary unit 106 to allow optical communication from the stationary unit 106 to the camera head 102 in addition to the up-link optical communication from the camera head 102 to the stationary unit 106. According to one embodiment the up-link optical transmitter 122 and down-link optical receiver 210 of the camera head 102 are arranged separately and are arranged for coupling into the optical waveguide 116. The up-link optical receiver 124 and down-link optical transmitter 212 of the stationary unit 106 are arranged in a similar fashion. This may be achieved by mounting the up-link optical transmitter 122 and the down-link optical receiver 210 in the camera head 102 close to each other in order to couple both of them to the optical waveguide 116. The up-link optical receiver 124 and the down-link optical transmitter 212 in the stationary unit may also be mounted as close to each other that both are enabled to couple to the optical waveguide 116. This could also be achieved by using a transceiver, capable of both transmitting light and receiving light, at both the camera head and the stationary unit.

The light used for communication in the up-link i.e. communication from the camera head 102 to the stationary unit 106 could interfere with the light communication in the down-link i.e. communication from the stationary unit 106 to the camera head 102. To avoid forward traveling light interfering with backward traveling light it is possible to use different frequencies, wavelengths, or colors for the up-link communication and down-link communication respectively. Using an optical fiber as optical wave guide 116 it is possible to guide the up-link communication in the core of the fiber and the down-link communication in the cladding of the fiber or vice versa.

Figure 8A:
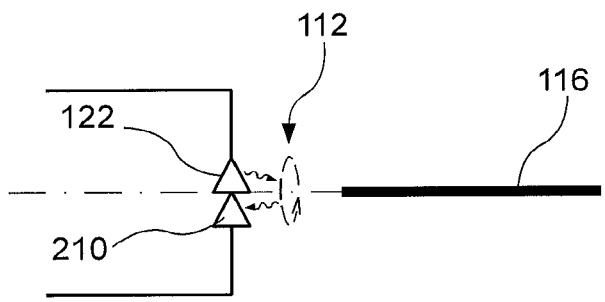
FIG. 8a is a schematic view of an optical coupling that may be used at the rotary joints.

As previously mentioned the optical coupling across any one of the joints 108 or 112 may be performed directly from the transmitter 122, 212 to the end 118, 120, of the optical waveguide 116 or/and directly from the end 118, 120, of the optical waveguide 116 to the receiver 124, 210. This configuration is shown in FIG. 8a relating only to the optical coupling across joint 112. However, an optical coupling across joint 108 may be identical.

In one embodiment enabling the optical coupling of FIG. 8a the transmitter 122 and the receiver 210 are arranged close to each other and directed towards the end 118 of the optical waveguide 116. In another embodiment an optical multichip module implementing a laser and a receiver in the same housing is used.

It is possible to implement the optical coupling like this because the communication link is very short, e.g. shorter than one meter, and does not introduce enough signal attenuation to be a problem. Hence, the optical coupling does not have to be perfect but may work properly even if some light is lost during the transfer.

Figure 8B:
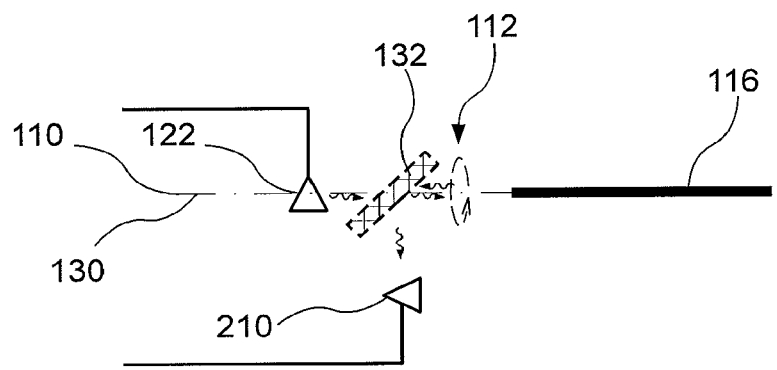
FIG. 8b is a schematic view of another optical coupling that may be used at the rotary joints.

According to another embodiment, see FIG. 8b, the transmitter 122 and the receiver 210 are optically coupled to the same end 118 of the optical waveguide 116 by means of a half reflecting mirror 132 mounted substantially in a 45 degree angle in relation to an optical axis 130 of the optical waveguide 116, which in the embodiment depicted in FIG. 8b coincides with the rotational axis 110 of the joint 112. Then one of the transmitter 122 and the receiver 210, in this case the transmitter 122, is arranged directly in the optical path of the optical waveguide 116 for transmitting light through the mirror 132 and the other, in this case the receiver 210, is arranged facing the optical axis 130 at an 90 degrees angle for receiving light sent from the optical waveguide 116 and reflected by the half reflective mirror 132. The transmitter 122 and the receiver 210 may change places without affecting the functionality of the arrangement.

Figure 8C:
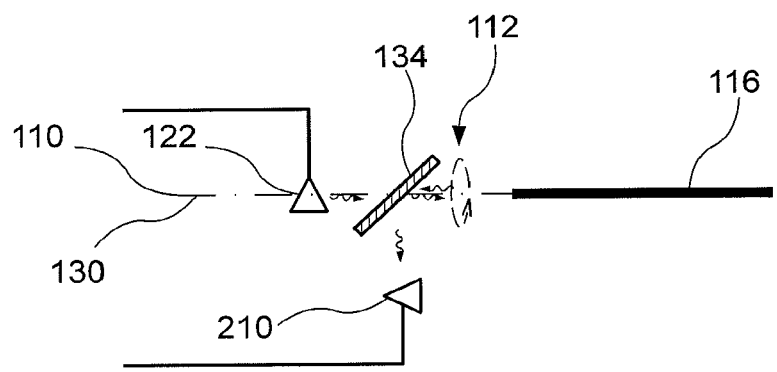
FIG. 8c is a schematic view of yet another optical coupling that may be used at the rotary joints.

In yet another embodiment the half reflecting mirror is replaced by a reflecting filter 134, see FIG. 8c. The reflecting filter 134 or the frequencies of the signals should be selected so that one frequency passes through the filter 134 while the other is reflected by the filter 134. Thereby achieving a similar effect as with the half reflecting mirror of FIG. 8b.

Accordingly, the optical communication path may be used to transfer data from the image capturing camera head 102 to the stationary unit 106 but may also be used to transfer data from the stationary unit 106 to the camera head 102. Data from the camera head 102 to the stationary unit 106 may comprise image data, camera feedback, image statistics etc and may need a high speed link to meet the demands on high frame rates and megapixel video. The provision of a high bandwidth link between the camera head and the stationary unit 106 is even more advantageous in that it enables transmission of unprocessed, uncompressed or raw image data. Data to the camera head 102 from the stationary unit 106 may comprise data relating to mechanical settings for zoom, focus, and tilt, may comprise data relating to register settings and control signals to the image sensor, e.g. controlling the timing of an image sensor of the camera, and may be a low speed link due to the limited data amount transmitted in this direction.

Figure 4A:
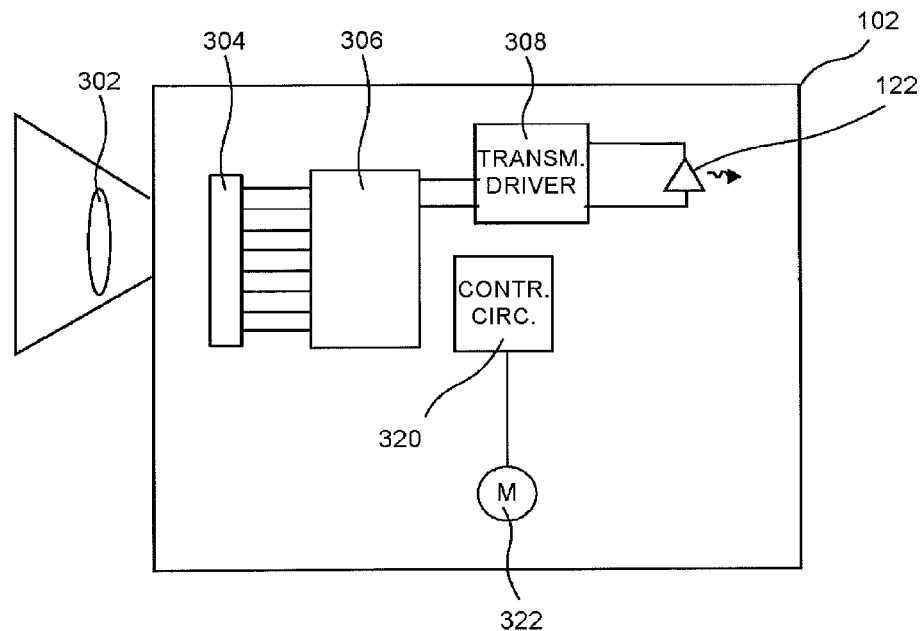
FIG. 4a is a schematic view of a camera head unit.

FIG. 4a shows a schematic view of a camera head 102. The camera head 102 captures an image through a lens 302 and the image is then projected onto a sensor 304. The sensor 304 may be an image sensor of the type CCD, CMOS, etc. The received image in the sensor 304 is translated into an electrical signal and then fed into a processing device 306 which may have the main functionality of ND-converting the inputs from the sensor and to serialize the digital data into a serial data format. The serial data format is then fed into a transmitter driver 308 where the serial data is sent to the transmitter 122. The serial data format received in the transmitter 122 is converted into an optical signal and then emitted out from the transmitter 122 as light. The camera head may also include a control circuit 320 for a tilting motor 322 arranged in or at the camera head for turning the camera head in relation to the intermediate member 104. The control circuit 320 is arranged to control the speed and the rotational direction of the tilting motor 322 and thereby the turning of the camera head 102 in relation to the intermediate member 104 based on a control signal received from a pan tilt control means arranged either in the camera head 102 or in the stationary unit 106. The control circuit 320 may be arranged to control other properties as well, e.g. zoom, focus, etc.

In the embodiment of FIG. 4a the tilting motor 322 is arranged in the camera head 102 and is arranged for interaction with the intermediate member 104 in order to realize the tilting motion of the camera head. The direction of the rotational tilting motion being essentially orthogonal to a direction of a rotational panning motion realized by having a motor in the stationary part rotate the intermediate member 104 and thereby the camera head 102 as well. By arranging the tilting motor 322 in the camera head instead of in the intermediate member 104, it becomes possible to manufacture the intermediate member 104 without installing any electrical devices, except for possible wiring and/or other transfer means passing through the intermediate member 104 between the stationary member 106 and the camera head 102. This may facilitate the production of the intermediate member 104 as it becomes less complex and an entire processing step is not needed any more, i.e. no installation of electrical devices.

Figure 4B:
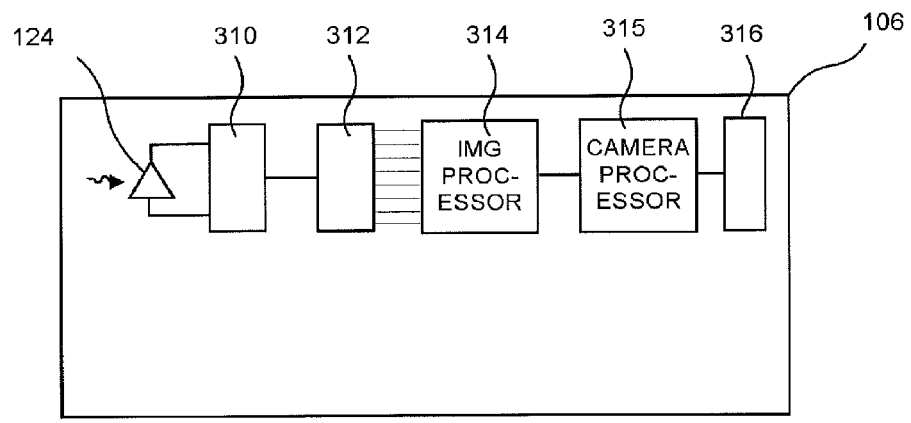
FIG. 4b is a schematic view of a stationary unit.

FIG. 4b shows a schematic view of a stationary unit 106 according to one embodiment of the invention. The stationary unit 106 as illustrated in FIG. 4b is arranged to receive an optical signal originating from the camera head 102. The optical signal, which at least includes image data, is received in the optical receiver 124 and translated into an electrical signal. The electrical signal is fed into a transimpedance amplifier (TIA) 310 that converts and amplifies the electrical signal and then sends the amplified signal into a deserializer 312. The deserializer 312 converts the received serial data format into a parallel data format and feeds this signal into an image processing unit 314. The output signal from the image processing unit 314 is transmitted for further processing to a system processor 315, which also is arranged to operate the camera as a whole. Then the resulting image/images may be sent to a network using an Ethernet interface 316.

Figure 4C:
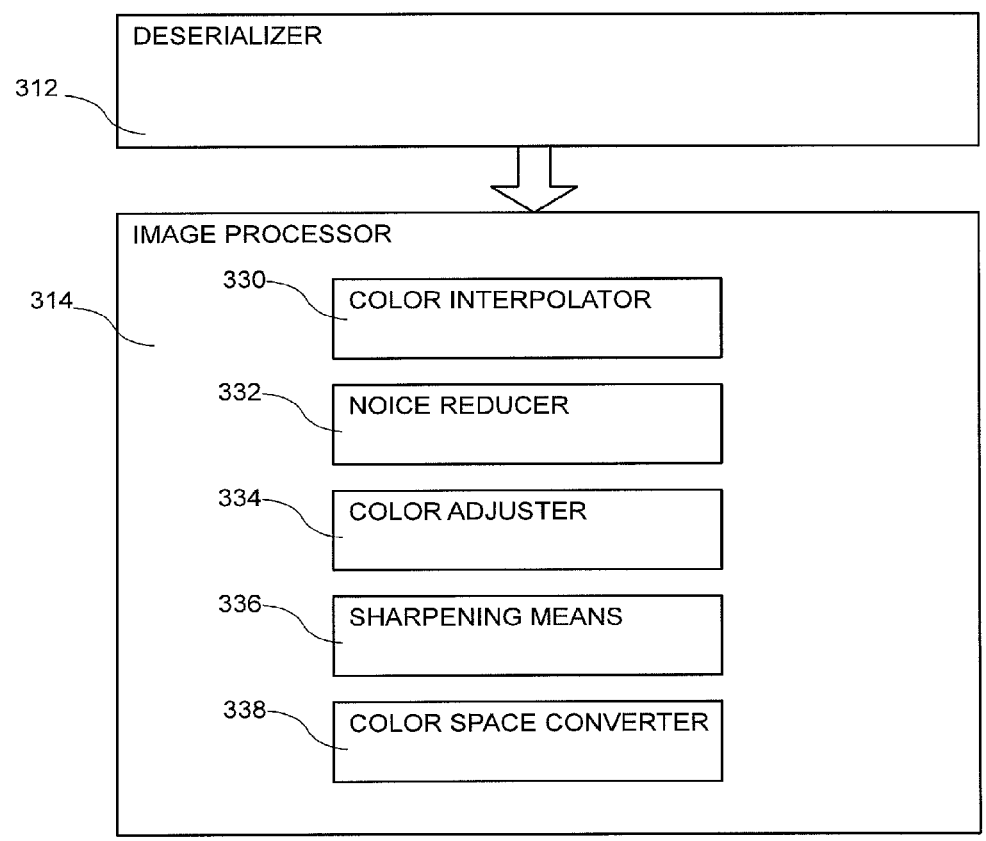
FIG. 4c is a schematic view of an image processing unit from the stationary unit depicted in FIG. 4b.

The image processing unit 314 from FIG. 4b is depicted in more detail in FIG. 4c. As mentioned above, the deserializer 312 deserializes the serial data format and provides the image processing unit with image information corresponding to the image information that was serialized in the camera head. The image processing unit 314 may comprise a color interpolator 330, a noise reducer 332, a color adjuster 334, a sharpening means 336, and a color space converter 338. It is not necessary for the image processing unit to include all these devices. It is even possible for an implementation to include any combination of them, from a single one of the devices to any number of devices combined. Further, the image processing unit 314 may include additional devices and/or functions not described herein.

According to one embodiment the color interpolator 330 is a Bayer pattern interpolator which is arranged to interpolate a Bayer pattern image received from the image sensor 304. This interpolation may be performed by means of various demosaicing algorithms interpolating a set of red, green, and blue values for each pixel.

In one embodiment the image processing unit 314 includes a noise reducer arranged to reduce either spatial image noise, temporal image noise, or both.

The color adjuster 334, if included in the image processing unit 314, is arranged to adjust the color of the image and may for example be a function for adjusting the white balance of the image. The sharpening means 336 may be any device arranged to provide sharpening to an image, e.g. an "un-sharp mask" filter. The Color space converter 338 is arranged to convert the image data from one color space to another.

According to one embodiment the image processing unit 314 connected to the deserializer 312 is an Axis Real Time Picture EnCoder (ARTPEC) chip. The ARTPEC chip includes the functionality previously described and the functionality of performing such camera controller functions as managing the exposure, e.g. light level of image, and of video compression, arranged to compresses the digital image into an image containing less data for efficient transfer over the network.

The benefits of arranging the image processing unit 314 in the stationary unit are several. One benefit, as previously discussed is that an image processing unit 314 as the one described herein generate a lot of heat. This heat generation is a result of each of the above described functions/devices included in the image processing unit 314 being very computing intensive and when a plurality of them are implemented the computing intensity of the image processing unit becomes even higher. Further, many of the functions/devices require fast memory access to access older images or other recorded data. Therefore the image processing unit 314 requires a lot of electrical current which generated heat, the more current the more heat. In addition moving the image processing unit 314 less power is required in the camera head which in turn reduces the heat generated in the camera head. Hence yet another advantage of arranging the image processing unit 314 in the stationary unit 106 is that the resulting image quality from the camera is improved. This is so as a result of image sensors being sensitive to heat and generating thermal sensor noise when heated, the arrangement of the computing intensive image processing unit 314 in the stationary unit 106 reduces the amount of heat that the image sensor is exposed to and thereby the image quality of the images from the camera is evidently increased.

Additionally, using an optical communication path having a high bandwidth allows the captured image data to be sent substantially unprocessed over the communication path. This optical communication path makes it more feasible to have the processing carried out in the stationary unit 106. The optical components 122, 124, 210, 212 used in the communication path are small in size and this fact in combination with the fact that the image processing unit 314 is arranged in the stationary unit 106 instead for in the camera head 102 allows the camera to be smaller in size. Moreover, mechanical wearing, which are a problem when using electrical wiring as well as any wiring going through each of the joints, is eliminated with by the use of the optical information transfer through the pan and tilt joints respectively.

Figure 5A:
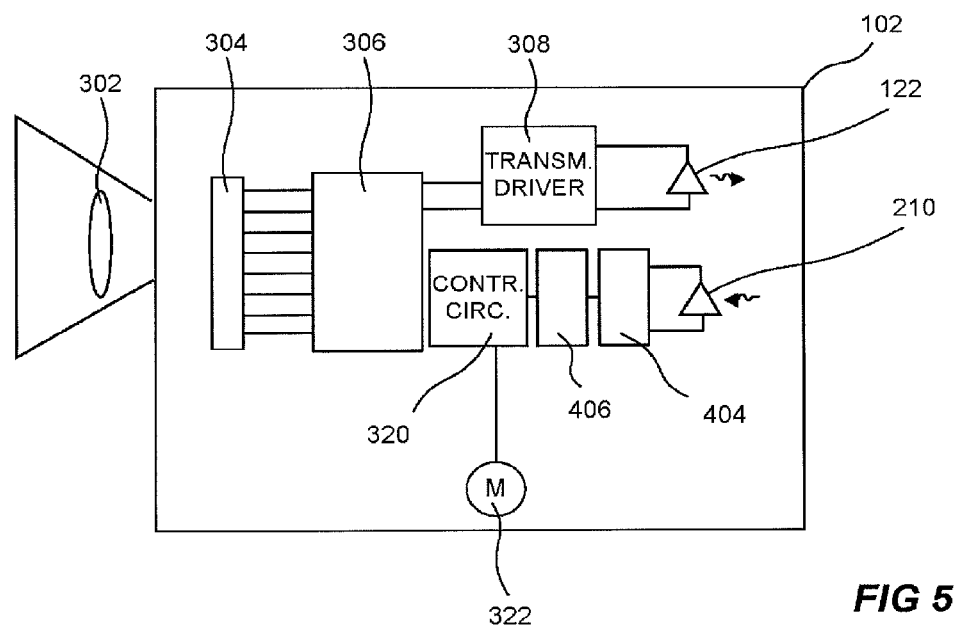
FIG. 5a is a schematic view of a camera head unit including an optical backchannel.

FIG. 5a shows a schematic view of a camera head 102 including an optical down-link. The up-link communication path is the same as the one described previously in connection with FIGS. 4a-b. The optical down-link comprises an optical receiver 210 that receives an optical signal originating from the stationary unit 106. The optical signal is translated into an electrical signal and then amplified through an amplifier 404. The serial data format of the electrical signal is then transformed into a parallel data in serial-to-parallel unit 406 format and sent to various control circuits 320, such as control circuits for the tilting motor 322, an iris of the camera, an infra-red (IR) filter, a camera zoom, a focus means. A preferred embodiment of the down-link is to use the optical waveguide 116 together with an optical transmitter 212 and receiver 210, but alternative solutions are possible.

Figure 5B:
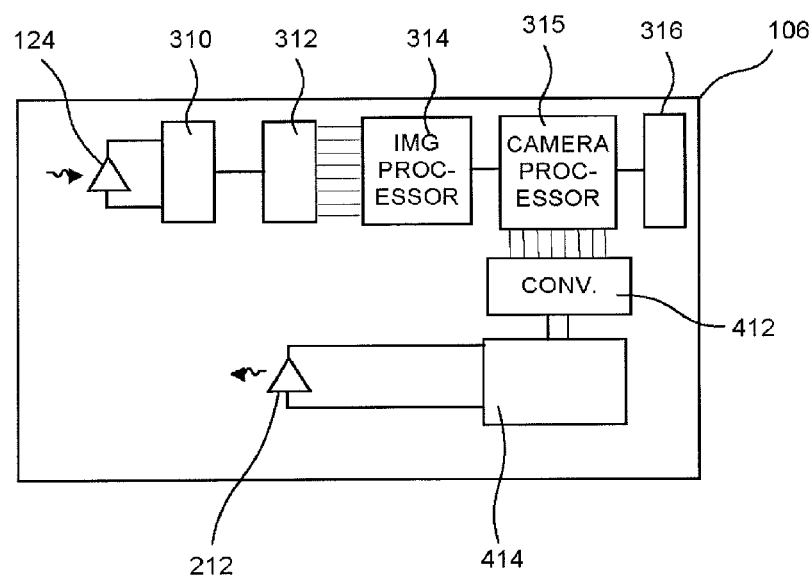
FIG. 5b is a schematic view of a stationary unit including an optical backchannel.

FIG. 5b shows a schematic view of a stationary unit 106 including an optical down-link according to one embodiment of the invention. The signal that is to be sent to the camera head, for example to control the tilting motor or change the zoom of the camera, may be received at the camera system processing unit 315 from the Ethernet interface 316 where the output signal from the camera processing unit 315 is sent to a parallel-to-serial converter 412. The serial data format is fed into a transmitter driver 414 and the output from the transmitter driver 414 is fed into the optical transmitter 212 wherein the electrical signal is converted into a corresponding optical signal.

Figure 6A:
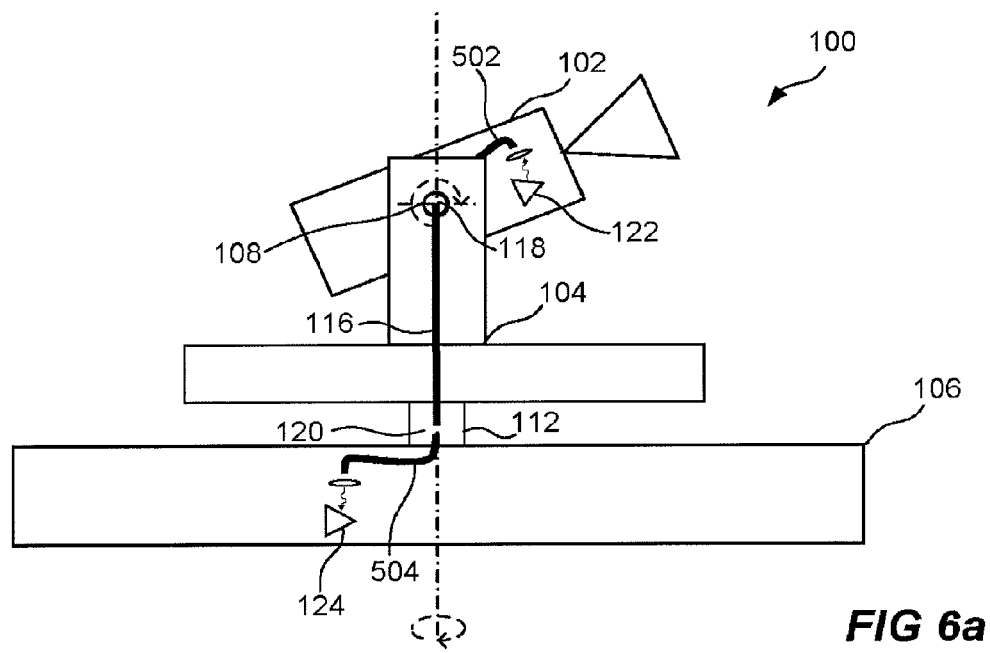
FIG. 6a is a perspective view of a camera unit comprising a camera head, intermediate member, panning unit and a stationary unit according to an alternative embodiment.
Figure 6B:
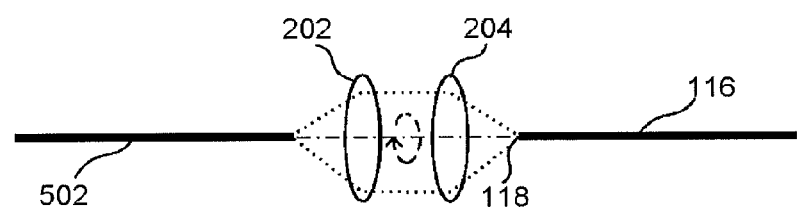
Figure 6B:
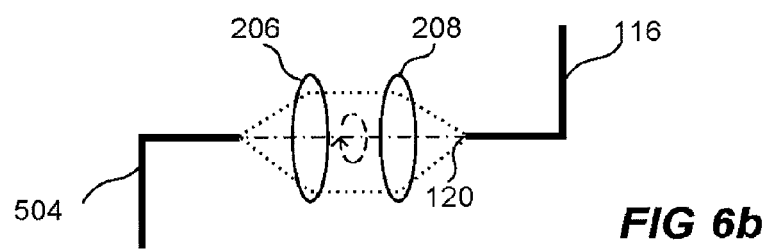

FIG. 6a shows a perspective view of an alternative embodiment of a camera unit 100 comprising a camera head 102, intermediate member 104 and a stationary unit 106. The difference compared to the previously described camera unit 100 lies in the communication path. The optical communication path is extended using an optical wave guide 502 in the camera head 102 as well as an optical wave guide 504 in the stationary unit 106. The optical coupling in the tilt joint 108 and the panning joint 112 will then differ from the ones previously described, as illustrated in FIG. 6b. FIG. 6b shows an optical waveguide 116 optically connected to another optical waveguide 502, 504 over each of the joints 108, 112. In some cases, when for example using an optical fiber as a waveguide it is convenient to use a fiber to fiber connection allowing for a better bi-directionality to be achieved at that joint.

As mentioned above in connection with the FIGS. 3a-b the optical waveguide may be used as a down-link in addition to its use as an up-link by sending light in the opposite direction through the wave guide.

However, in some cameras, especially in the cameras where the main processing capacity has been positioned in the stationary unit 106, the amount of data required to be sent in the down link is low. This data mainly relates to tilting the camera head 102, zooming, and focusing, and to setting of parameters such as aperture and shutter speed. Accordingly, in those cases neither a high speed connection nor a high bandwidth connection is required. As the requirements on such a down-link path may be quite modest it may be possible to implement the down-link path by using a simple slip ring design at the joint 112 between the stationary unit 106 and the intermediate member 104 and at the joint 108 or 107 between the intermediate member 104 and the camera head 102. In another embodiment the down-link path between the intermediate member and the camera head may be implemented by means of a cable or cables.

According to another embodiment the down-link path is implemented as a wireless communication path between the stationary unit 106 and the camera head 102. This may be implemented by connecting a wireless transmitter to the circuitry of the stationary unit 106 and a wireless receiver to the circuitry of the camera head 102. The wireless transmitter and the wireless receiver may implementing any one of a plurality of wireless standards, e.g. a point to point coded radio link, Bluetooth, Wi-Fi (IEEE 802.11a,b,g,n), etc.

Figure 7A:
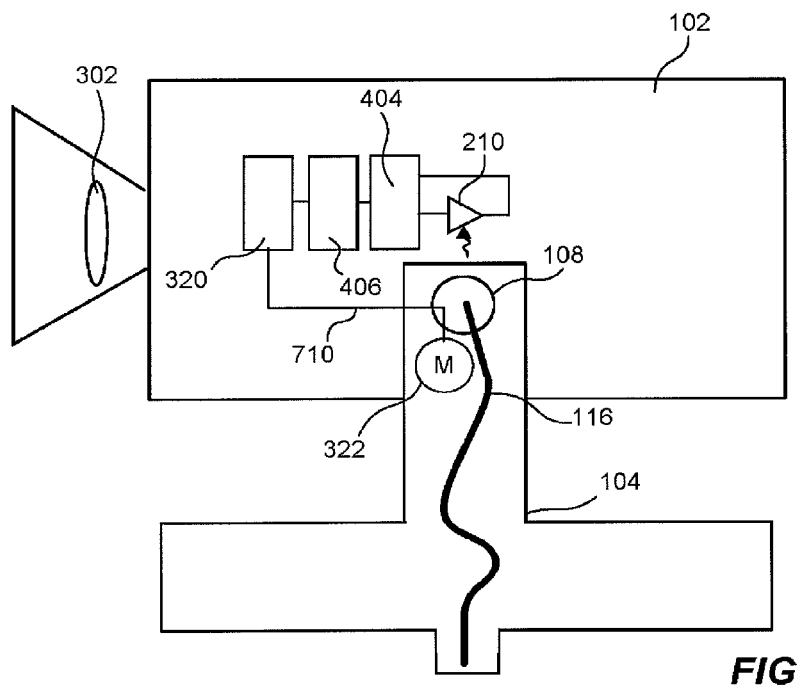
FIG. 7a is a schematic view of a camera head and an intermediate member showing one possible arrangement for a tilting motor of the PT camera.

The tilting of the camera head may be performed by means of a motor 322 controlled by a control circuit 320 as described in connection with FIGS. 4a and 5a. However, according an alternative embodiment, see FIG. 7a, the motor is arranged in the intermediate member 104 and is controlled by the control circuit 320 in the camera head 102. The motor 322 may be connected to the control circuit via a cable 710 arranged through the joint 108. One advantage of arranging the motor in the intermediate member 104 instead of in the camera head 102 is that weight of the camera head 102 is reduced and thereby make the camera head 102 easier to control. In addition the heat in the camera head 102 may be reduced.

Figure 7B:
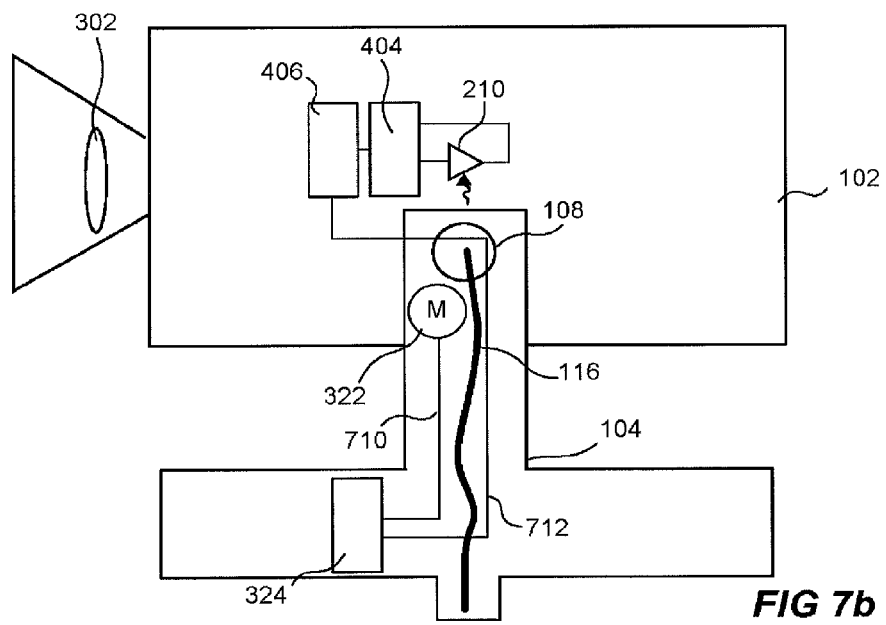
FIG. 7b is a schematic view of a camera head and an intermediate member showing another possible arrangement for a tilting motor of the PT camera.

In yet another alternative embodiment, see FIG. 7b, at least the control circuit 324 for controlling the motor 322 is placed in the intermediate member 104 and according, to one embodiment, receives instructions from the circuitry of the camera head 102 via a cable 712. Then the motor 322 operating the tilting of associated with the tilting joint 108 is also arranged in the intermediate member and connected to the control circuit 324. The advantages are the same as for the alternative described in connection with FIG. 7a.

In any of the above described embodiments it is necessary to provide power to electronic components and circuits in the camera head 102. As the stationary unit 106 is stationary, as its name suggests, power may easily be connected to the camera at the stationary unit. One way of transporting the power from the stationary unit to the camera head 102 is by arranging an electric slip ring for power transport between the stationary unit 106 and the intermediate member 104 and another electric slip ring for power transport between the intermediate part 104 and the camera head 102. These slip rings may be manufactured at quite low cost, because even simple design slip rings perform well in transporting power.

The slip ring between the intermediate member 104 and the camera head 102 may be substituted for a cable because most cameras are designed to enable turning of the camera head in relation to the intermediate part by less than 360 degrees, often about 180 degrees.

The person skilled in the art realizes that the present invention by no means is limited to the preferred embodiments described above. Many modifications and variations are possible within the scope of the appended claims.

What is claimed is:

1. A camera comprising:
a camera head including an image sensor;
a stationary unit;
a cable connected between the camera head and the stationary unit configured to transmit image signals from the camera head to the stationary unit;
a cable connected between the stationary unit and the camera head configured to transmit data relating to setting of shutter speed from the stationary unit to the camera head; and
an image processing unit arranged in the stationary unit, said image processing unit including a color interpolator arranged to perform demosaicing of the image data from the image sensor,
wherein the camera head does not comprise any image processing unit performing demosaicing of image data from the image sensor.

2. The camera according to claim 1, wherein the image processing unit in the stationary unit is arranged to process raw image data.

3. The camera according to claim 2, wherein the image processing unit arranged in the stationary unit further includes a noise reducer.

4. The camera according to claim 3, wherein the image processing unit arranged in the stationary unit further includes a color space converter.

5. The camera according to claim 4, wherein the image processing unit arranged in the stationary unit further includes an image compressor for compressing the image data.

6. The camera according to claim 5, wherein the color interpolator is a Bayer pattern interpolator.

7. The camera according to claim 6, wherein the camera head is arranged to be tilted around a tilting axis and panned around a pan axis.

8. The camera according to claim 1, wherein the image processing unit arranged in the stationary unit further includes a noise reducer.

9. The camera according to claim 8, wherein the image processing unit arranged in the stationary unit further includes a color space converter.

10. The camera according to claim 9, wherein the image processing unit arranged in the stationary unit further includes an image compressor for compressing the image data.

11. The camera according to claim 10, wherein the color interpolator is a Bayer pattern interpolator.

12. The camera according to claim 11, wherein the camera head is arranged to be tilted around a tilting axis and panned around a pan axis.

13. The camera according to claim 1, wherein the image processing unit arranged in the stationary unit further includes a color space converter.

14. The camera according to claim 13, wherein the image processing unit arranged in the stationary unit further includes an image compressor for compressing the image data.

15. The camera according to claim 14, wherein the color interpolator is a Bayer pattern interpolator.

16. The camera according to claim 1, wherein the camera head is arranged to be tilted around a tilting axis and panned around a pan axis.

17. The camera according to claim 1, wherein the image processing unit arranged in the stationary unit further includes an image compressor for compressing the image data.

18. The camera according to claim 1, wherein the color interpolator is a Bayer pattern interpolator.

19. The camera according to claim 18, wherein the camera head is arranged to be tilted around a tilting axis and panned around a pan axis.

* * * * *